United States Patent [19]

Marzocchi

[11] 3,844,327

[45] Oct. 29, 1974

[54] VULCANIZABLE ELASTOMERIC SHEET CONTAINING CORD REINFORCEMENT

[75] Inventor: Alfred Marzocchi, Cumberland, R.I.

[73] Assignee: Owens-Corning Fiberglas Corporation, Toledo, Ohio

[22] Filed: Apr. 10, 1972

[21] Appl. No.: 242,704

[52] U.S. Cl..................... 152/354, 152/357, 161/60
[51] Int. Cl............................................... B60c 9/06
[58] Field of Search ........... 152/354, 355, 356, 357, 152/359, 361; 161/55, 57, 59, 60, 169, 170

[56] References Cited
UNITED STATES PATENTS

| | | | |
|---|---|---|---|
| 2,569,546 | 10/1951 | Treue | 161/169 |
| 3,095,027 | 6/1963 | Weber | 152/361 |
| 3,244,214 | 4/1966 | Bush | 152/354 |
| 3,554,260 | 1/1971 | Shoemaker | 152/359 |
| 3,570,574 | 3/1971 | Marker et al. | 152/361 R |

Primary Examiner—M. Henson Wood, Jr.
Assistant Examiner—Robert Saifer
Attorney, Agent, or Firm—Carl G. Staelin; John W. Overman

[57] ABSTRACT

Vulcanizable elastomeric sheet containing substantially inextensible reinforcement cord of utility in the manufacture of rubber products is disclosed, said sheet containing mutually parallel rows of aligned lengths of substantially inextensible cord material, said lengths having ends in practically contacting relationship by reason of a pattern of cutting utilizing counter-rotating rollers, one of which has a pattern of radially extending cutter blades and said blades being arranged in a pattern which is transmitted to the continuous sheet passed between said rollers, said pattern of cuts being such that cuts in adjacent row are in staggered relationship and preferably such that an imaginary line connecting same proceeds in generally nonuniform zigzag fashion laterally across the sheet.

5 Claims, 8 Drawing Figures

PATENTED OCT 29 1974 3,844,327

VULCANIZABLE ELASTOMERIC SHEET CONTAINING CORD REINFORCEMENT

The present invention relates to the manufacture of rubber products and more particularly to the manufacture of rubber products desirably containing cord reinforcement to impart strength and resistance to the forces and stresses encountered by the rubber product under service conditions.

The invention will be described in connection with the manufacture of sheet material of utility in the manufacture of automotive vehicle tires, albeit it should be recognized that the sheet material and method of producing said sheet material will find utility and application in the manufacture of a wide variety of rubber or elastomeric products.

A considerable variety of textile yarn, strand, filament and cord materials have been employed in the manufacture of tires and other rubber products. Such rubber products, it may be mentioned, include belts, hoses, diaphragms, etc. Fabrics featuring a variety of textile materials have also been employed. Thus, over the years, cotton, rayon, nylon, polyester (Dacron), fine gauge high tensile steel wire, cables and, as well, filaments and multiplicities of filaments such as strands, yarns, cords of glass have been employed. All of these materials have their own individual properties which at one time or another have been taken advantage of in fabricating or building a rubber product. These materials, of course, also have their shortcomings in the way of properties which are not so desirable. A summary of the chronological history of the employment of these various materials is contained in the specification of U.S. Pat. Nos. 3,315,722 and 3,311,152 assigned to Owens-Corning Fiberglas Corporation.

Glass, of course, is essentially inextensible as is metallic wire and, to a lesser extent, certain polyesters. Accordingly, it has been suggested that inextensible materials would have utility as a reinforcement for rubber products wherein it was desirable to limit the extensibility and expansibility of the structure under consideration, particularly in the vulcanized state. Metal wire and twisted assemblies of metal wires have been employed in the manufacture of so-called radial tires featuring a carcass ply wherein the reinforcement cords extend in the shortest possible path from bead to bead. This path is frequently referred to as normal to the circumferential centerline of the tire; the latter being coincident with the centermost tread groove. A metal cord or twisted together assembly of metal filaments is desirable in that it exerts a restrictive effect on the torus shape of the tire. At the same time, radial tires are characterized by a rather heavily built-up region in the crown region, which is that region extending across the tire where it contacts the ground. This area is generally beefed up by incorporating therein breaker strips or belt plies containing arrays of mutually parallel cords, usually of metal in the European radial tire.

Glass has been suggested as a reinforcement material for tires, as indicated hereinbefore. The radial tire has some definite advantages over the conventional U.S. bias-type tire in which the carcass is made up of several plies extending from bead to bead, each composed of mutually parallel cords which are disposed at a bias angle with the peripheral centerline in their path from one bead through the side wall, shoulder, across the crown and down to the opposite side. Radial tires have desirable attributes by reason of the breaker strip or belt ply arrangement in the crown region above the carcass and beneath the tread which lends stability to the tire through the provision for a firm stable footprint, as it were, despite the stresses induced by such as cornering speed, to which the tire is subjected when mounted on the wheel of the vehicle concerned.

Radial tires have the disadvantage that special fabricating apparatus is usually necessary. Thus, in a conventional tire manufacture, that is, the bias type tire, all of the tire components are assembled together on a tire building drum, following which the drum is collapsed and the cylindrical, beer barrel shaped, uncured or "green" tire is removed and located in a mold of the final tire configuration, whereupon the "green" tire of generally beer barrel shape is expanded outwardly, particularly at the crown region, by expansion of an inner tube-like structure into the ultimate torus configuration as the tire is going through the cure cycle. Now with a radial tire, this type of manufacture is not followed since the belt plies or breaker strip plies are either totally or relatively non-expansible. Accordingly, in the manufacture of radial tires, it is conventional to build the carcass on a cylindrical drum but before the tread reinforcing plies and tread are applied, the cylindrical "green" tire is expanded into approximately the form of the ultimate tire whereupon the tread reinforcement belts or breaker strips are circumferentially wrapped around and knitted together by appropriate formers and tools. Then the tread stock is applied about the belts or breaker plies whereupon that structure is then subjected to vulcanization. What has just been described is essentially a two-step manufacturing operation employed in the fabrication of radial tires.

In view of the heavy investment in so-called conventional drum building equipment employed in U.S. bias tire manufacture, it is desirable to try to employ this equipment in the fabrication and building of radial tires.

It is an object of the present invention to provide a method of manufacturing a sheet material of essentially continuous nature; which sheet material is elastomeric, is vulcanizable and contains a reinforcement material which is essentially of nonextensible character but which is processed in such a manner that the sheet itself is to a certain extent extensible.

It is a significant object of the present invention to provide a method which is relatively easy to carry out involving neither expensive apparatus, equipment or time-consuming modifications in conventional processes employed in producing vulcanizable elastomeric sheet material used in the downstream fabrication of rubber products.

It is also an object of the present invention to provide such a reinforcement containing sheet material which in its ultimate vulcanized form will embody some of the attributes associated with a rubber product containing nonextensible reinforcemement, while at the same time the product or the sheet will exhibit some extensibility.

It is yet another object of the present invention to provide a rubber product containing substantially aligned lengths of inextensible cord material in which the terminal ends of the lengths are in offset relationship.

The foregoing as well as other objects of the present invention will become apparent to those skilled in the art from the following detailed description taken in conjunction with the annexed sheets of drawings on which there are presented, for purposes of illustration only, several embodiments of the present invention.

Viewed most simply, the present invention envisions a reinforcement technique for rubber products; the reinforcement technique featuring method of manufacture or treatment or processing and the ultimate product of this manufacturing process which, by reason thereof, is possessed of unique properties in terms of ultimate reinforcement of rubber products while minimizing inherent weaknesses as might be imparted to the rubber sheet by reason of the carrying out of the technique of the present invention.

In a prime application for the sheet of the present invention, the ultimate product will be subjected to tension. Particularly in this so if one envisions the rubber sheet of the present invention employed as a breaker structure, that is, a breaker ply situated in the crown region of a tire, above the carcass and beneath the tread, or as a so-called belt ply. In this application, tension forces will be exerted on the structure as caused by inflation, heat build-up, impact with curbs, road defects, obstructions, etc., and combinations thereof. Rubber is capable of stretching and retaining strength. However, in tension, lateral forces such as impact are likely to seriously harm the rubber structures. To illustrate, if one stretches a common rubber band such that the band is in considerable tension, a very slight nick on the rubber band by a razor blade will cause the rubber band to fail.

Accordingly, it is an auxiliary object of the present invention to provide a vulcanizable elastomeric sheet containing essentially inextensible reinforcement and a method of producing such an inextensible cord reinforced elastomeric sheet in which the lengths of inextensible cord are in such aligned relationship that lateral forces will not be propagated laterally through the sheet. This is prevented by appropriate disposition of the lengths of substantially inextensible cord, principally cords formed of a multiplicity of glass filaments. This resistance to stress propagation is provided by proper location or disposition of the continuous lengths of inextensible material in a pattern best characterized as one in which an imaginary line connecting the ends of lengths in two adjacent rows does not extend to a terminal end of a length end in a third adjacent row.

IN THE DRAWINGS

Figure 1:
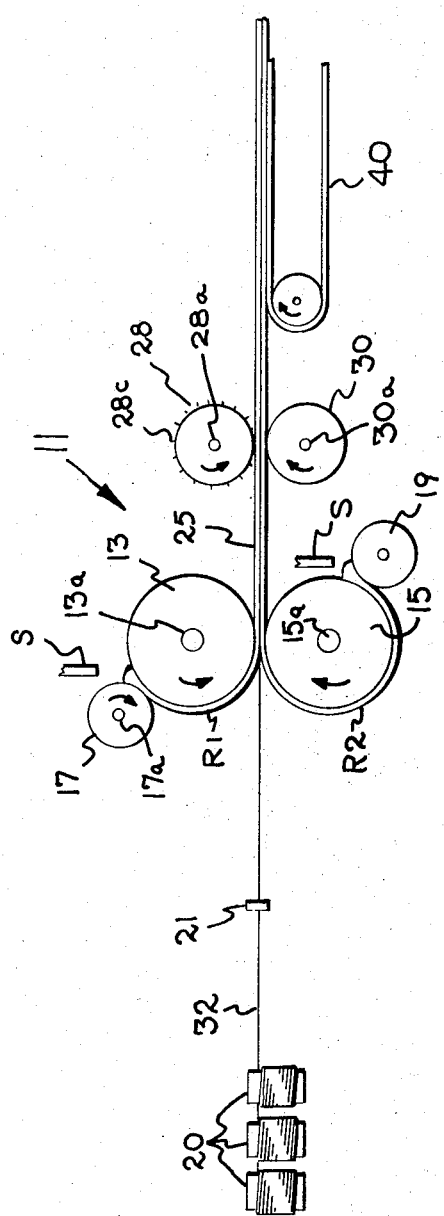
FIG. 1 is a side elevation view of a modified calendering operation embodying the novel features and steps of the present invention.

Referring more specifically to the drawings, in FIG. 1 the reference numeral 11 identifies a modified calendering setup in which counter-rotating rollers 13 and 15 revolve on vertically spaced horizontal shafts 13a and 15a suitably driven in a manner not shown. A feed roller 17 mounted on shaft 17a is suitably mounted for clockwise rotation above and to the left of roller 13 but spaced enough that a supply of rubber stock S, when introduced as shown, serves to provide a continuous layer of rubber R-1 on the downwardly counterclockwise moving surface of roller 13. A feed roller 19 to the lower right of roller 15 serves, when furnished a supply of rubber stock S, to produce a layer of rubber R-2 on the surface of clockwise rotating drum roller 15. The drums 13 and 15 move in the direction of the arrows, whereupon the layers merge at their point of tangency. Reference numeral 20 identifies a plurality of spools, of which there may be a large number, mounted for controlled continuous drawing of continuous lengths of cords 32 formed of a multiplicity of glass filaments. The cords are drawn from the reels through a comb or reed 21 which arranges the cords in mutually parallel spaced relationship. The cords then pass in essentially horizontal flat array between the two layers of rubber R-1 and R-2 carried on the surface of rollers 13 and 15. From the exit side of rollers 13 and 15, the composite sandwich 25 passes between a pair of counter-rotating rollers 28 and 30 suitably mounted for rotation on horizontal shafts 28a and 30a. The shafts rotate in the direction indicated by the arrows. The drum 28 has extending radially from its surface a plurality of cutter blades 28c which are disposed and arranged in a manner as to, in cooperation with the contact of the roller at 30, cut the cords of glass embedded in the sandwich 25 as the sandwich is fed therebetween, from which it passes on to a takeoff conveyor 40. Rollers 28 and 30 serve also as drive rollers, pulling the glass cords 32 from their supply spool arrangement 20. The roller 30 desirably bears on its surface a cushioning layer 30b, providing a resilient resistance to the action of the cutter blades 28c as they pass into and out of contact therewith as the drum 28 is rotated.

Figure 3:
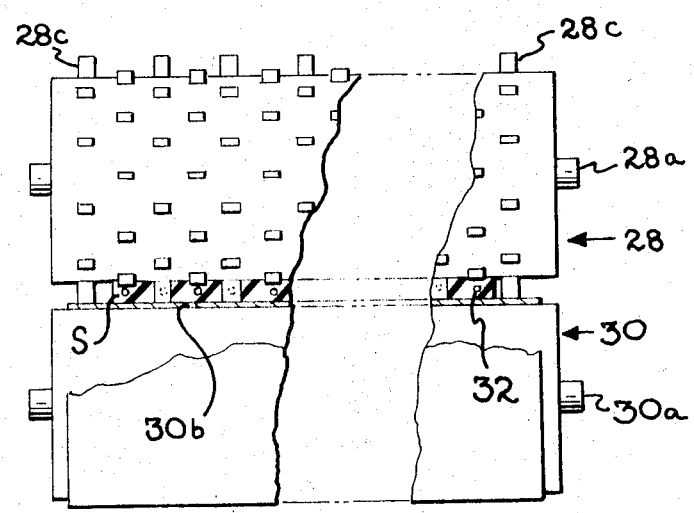
FIG. 3 is a front elevation view of a pair of roller components included in the operation shown in FIGS. 1 and 2 but here somewhat enlarged and partially broken away in order to show details of construction of special significance for an understanding of the present invention.

A pattern of disposition of cutter blades 28c is shown somewhat schematically and enlarged in FIG. 3. As can be seen, the plurality of blades 28c are generally arranged in a plurality of side-by-side rows which extend circumferentially about the drum surface in generally equispaced relationship. The circumferential distance between the cutting blades will, of course, determine the length of the cut segment into which the continuous lengths of cord fed inbetween the rollers is divided. The blades in adjacent rows are, in accordance with a preferred embodiment of the present invention, in offset relationship with respect to the blade in the adjacent circumferential row. The blades 28c are desirably releasably carried by the surface of the roller 28. Most desirably, the surface of the drum 28 is designed to contain a plurality of recesses for receiving the blades 28c. Desirably, these grooves or recesses are sufficient in number to provide a plurality of rows in which the individual grooves or recesses in a given circumferential row are spaced as close together as a half inch or even one-quarter inch. With each of the grooves containing a blade 28c, a given nonextensible cord reinforcement passing in alignment with the row considered will be cut into segments corresponding to the blade spacing. On the other hand, by removing every other blade, the distance between blades will be doubled, resulting in a doubling of the length of cord passing that particular row of blades. A considerable degree of latitude in designing the ultimately desired reinforcing sheet containing almost any length of generally nonextensible reinforcement cord and disposed in a variety of patterns is thus possible. With the arrangement as described, of course, it is possible to have the spaced parallel rows of inextensible reinforcement present in such fashion that one or more rows will feature a given cut length while one or more rows may not be cut at all. This is accomplished by removing appropriate cutter blades from the grooves in that row. Alternatively, the blades can be arranged to define a different spacing of the cut ends, yielding a different length cut segment. Generally speaking, the sheet should be cut by appropriate arrangement of the cutter blades into a repeating pattern so that the overall characteristic of the sheet will exhibit some considerable degree of uniformity. While there are a number of inextensible reinforcement materials which are generally included within the scope of the practice of the present invention, glass represents a preferred embodiment in view of its ready assimilability into the rubber as a reinforcement.

Glass, of course, is produced initially in the form of attenuated fibers or filaments drawn from an electrically heated bushing container having therein a supply of molten glass. Usually, a multiplicity of filaments are drawn from a single bushing containing an appropriate number of holes in the bottom of the bushing. These plurality of filaments are drawn at the same time and gathered together into a strand which may include 104 or 208 filaments and even up to 500 to 2,000 individual filaments. The strand in being gathered together is conveniently sprayed with a "size" to impart lubricity and, in the case of ultimate application in a rubber reinforcement, a particular size selected to impart improved compatibility with the elastomeric system. The filaments may be combined with or without twisting. The twist sometimes is employed to impart an integrity or unity to the strand, albeit that with certain sizes, the strand will be found to have sufficient integrity without twist. A given strand is usually plied, combined or assembled with other like strands to form a composite, frequently referred to as a yarn. The number of strands in a yarn may range from 2 up to 10 or 20 strands. Furthermore, a given yarn composed of a multiplicity of like strands is combined, to form an ultimate cord structure. By way of example, a strand formed of 208 filaments may be combined with 9 like strands to make a 10-strand yarn. Three of similarly plied yarns may be combined or plied together to form a 3-yarn cord. The number of filaments in the cord would then be the product of the number of yarns times the number of strands times the number of filaments. The combining of the strands into yarns and yarns into cords is accomplished with conventional textile plying equipment and need not be described herein.

As the strands are drawn from the bushing, as indicated above, they are desirably sprayed with a size material of which the following is a suitable example:

0.3 – 2.0 percent by weight gamma-aminopropyltriethoxy silane
0.3 – 0.6 percent by weight glycerine
Remainder water For maximum compatibility with the rubber matrix, it is desirable that the length of glass cord bear an elastomeric coating or, even more preferably, an elastomeric impregnant. An impregnant is preferred and this is accomplished by passing the cord submergedly through an impregnant bath. Essentially alternatively, the components making up the cord, either strands or yarns, are drawn or passed through an impregnant bath prior to being combined into cord configuration. A suitable impregnant bath may be any one of the liquid impregnant compositions set forth in U.S. Pat. No. 3,315,722 (assigned to the same assignee as the present application) and identified therein as Examples IV through VII.

Figure 2:
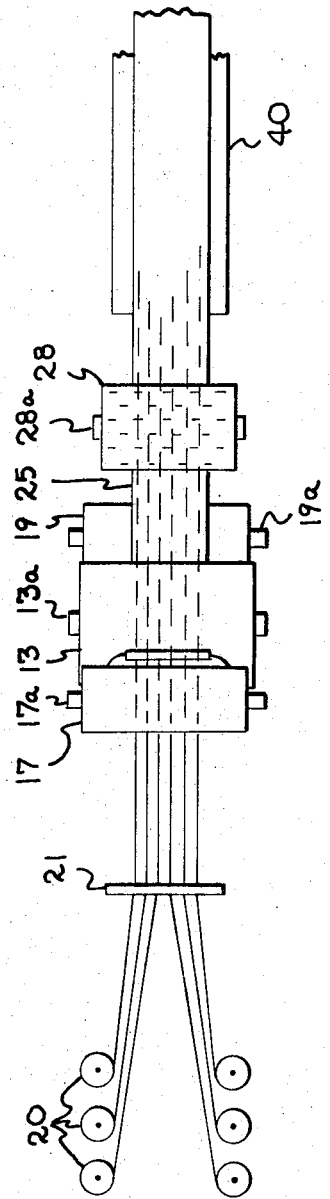
FIG. 2 is a top plan view of the operation illustrated in FIG. 1.
Figure 4:
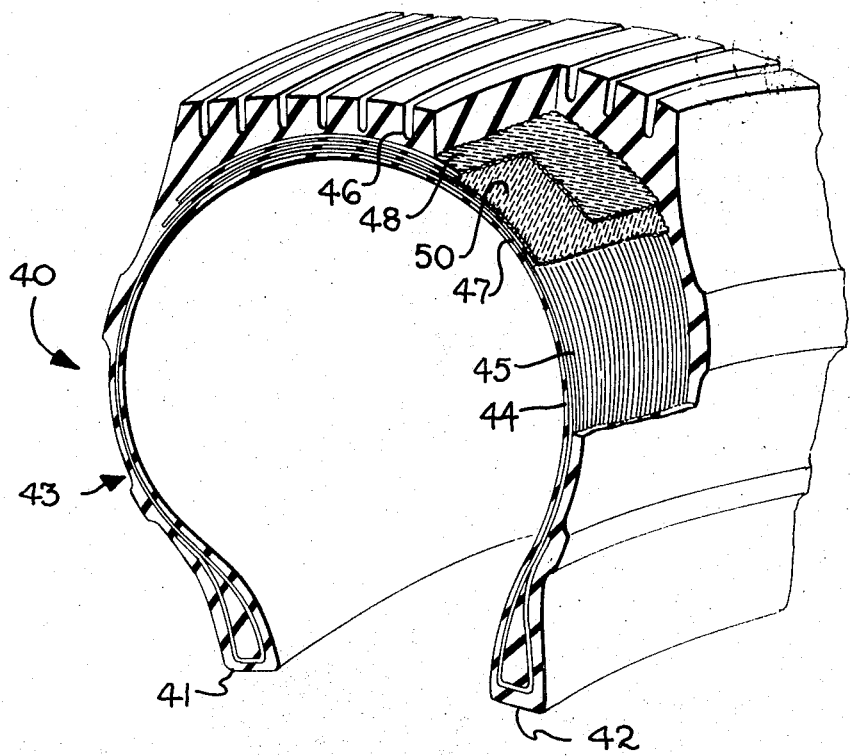
FIG. 4 is a three-quarter perspective view of a pneumatic tire having sections of the tread and elastomeric carcass broken away for purposes of showing in more detail the interior reinforcement structure featuring reinforcement sheet of the present invention.
Figure 8:
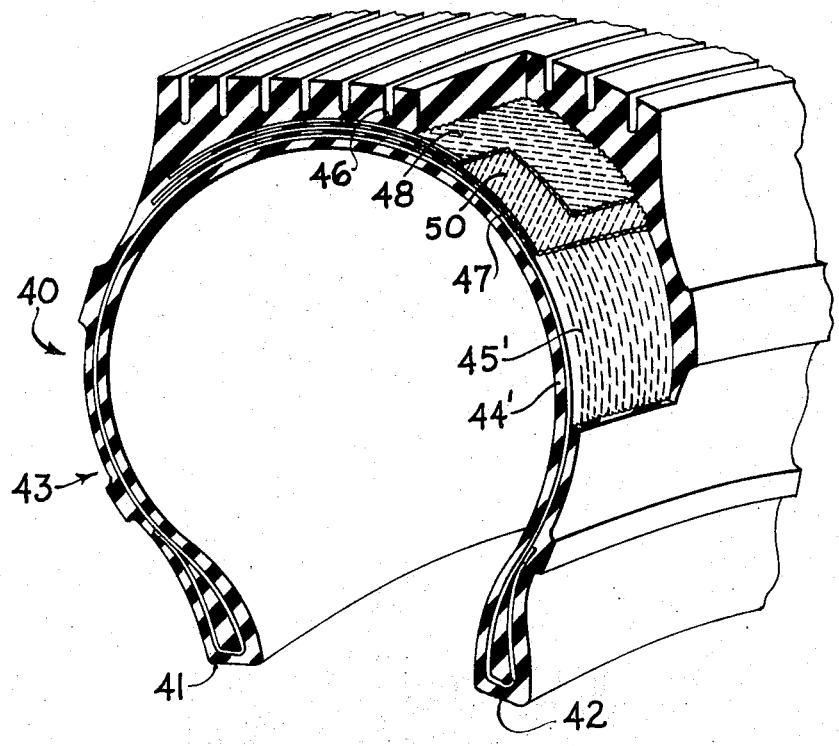
FIG. 8 is a view similar to FIG. 4 but using the reinforcement sheet of the present invention in the carcass ply.

Reference may now be had to FIG. 4 wherein there is illustrated a tire 40 featuring reinforcement sheet material embodying features in accordance with the present invention as produced in accordance with the method herein described. The tire includes spaced beads 41 and 42 connected by a carcass 43 extending in toroidal fashion from one bead to another. The tire illustrated features a radial construction; that is, the carcass ply 44 is composed of mutually parallel cords 45 which extend at right angles or normally to the circumferential centerline coincident with the center tread groove 46. The tire additionally includes in the crown region a pair of belt plies or breaker strips 47 and 48. Each of the breaker strips or belt plies 47 and 48 include a plurality of mutually parallel rows composed of aligned cut lengths 50 of substantially inextensible cord material, preferably produced as described hereinabove. The alignment of the rows of lengths 50 in belt or strip 47 is at an angle to the peripheral centerline (center groove 46) while the alignment of the lengths in breaker strip 48 is equally but oppositely inclined. The appropriate angular arrangement of the lengths 50 is accomplished by appropriate bias cutting of a sheet product of the method of the present invention as illustrated in FIGS. 1 and 2. It is within the framework of the present invention to employ the sheet such as represented by the plies 47 and 48 to form the carcass ply 44 which, as illustrated, features continuous lengths rather than the cut lengths as in the belt plies. The reinforcement sheet using discontinuous cords 45' can be used in the carcass ply 44' as shown in FIG. 8.

In accordance with a further embodiment of the present invention, the sheet material containing aligned discontinuous lengths may also contain a multiplicity of randomly disposed lengths of glass cords, strands, yarns and/or filaments. The amount of the latter may range from about 5 to about 30 percent by weight of the rubber elastomer. Most preferably in such case, the short lengths exhibit a pattern of mutually parallel orientation and usually parallel with the aligned discontinuous lengths.

Figure 5:
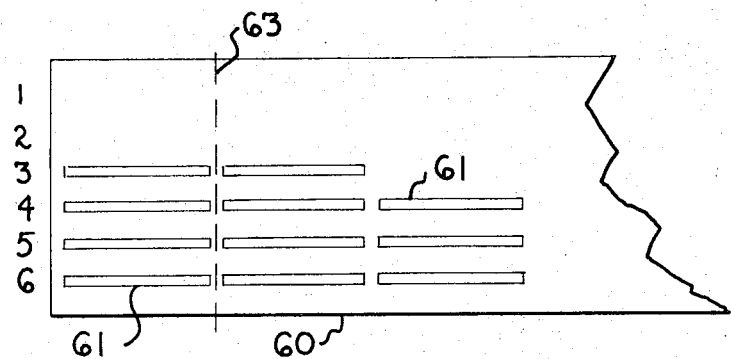
FIG. 5 is a schematic plan view of an elastomeric sheet containing lengths of substantially inextensible reinforcement material arranged in a particular pattern not representative of the present invention.

It will be recognized that the reinforcement cords either in the carcass ply or in the belt ply or breaker strip structure will be subjected to forces and stresses under service conditions. Some of these forces and stresses will be in the nature of compression forces, while others will be in the form of tension stresses. Rubber, of course, is stronger in compression than in tension. Where tension is involved and recognizing that tension forces and stresses will be encountered, it is desired and most preferable in accordance with one aspect of the present invention to have the aligned lengths of essentially inextensible cord, principally glass, arranged in a particular pattern with respect to lengths in adjacent rows. An understanding of this aspect of the present invention will be made clearer by reference to FIGS. 5-7. In FIG. 5, reference numeral 60 identifies a linear sheet which, for purposes of illustration, has been shown as containing 6 rows of aligned lengths of glass cord. The lengths are identified by the reference numeral 61 and in the drawing only 2 lengths are shown in Row 3, while 3 lengths are shown in each of Rows 4, 5 and 6. The terminal ends of the length 61 in Rows 6, 5 and 4 are in very closely spaced, almost touching, relationship by reason of the cutting operation employed in dividing the continuous lengths into individual shorter lengths. In the illustration of FIG. 5, an imaginary line 63 (shown dotted) connecting the terminal ends of lengths in adjacent rows is a straight line transverse to the longitudinal axis of the sheet; that is, normal to the alignment of the cut lengths of cords 61. The arrangement as shown in FIG. 5 is not representative of a preferred aspect of the present invention for the reason that the sheet 60, in tension, will contain a zone of potential weakness coincident with the imaginary line 63. A defect, tear or gouge, however, initiated in the sheet 60 or ply-containing sheet, will find a straight line path for propagation of the tear defect.

Figure 6:
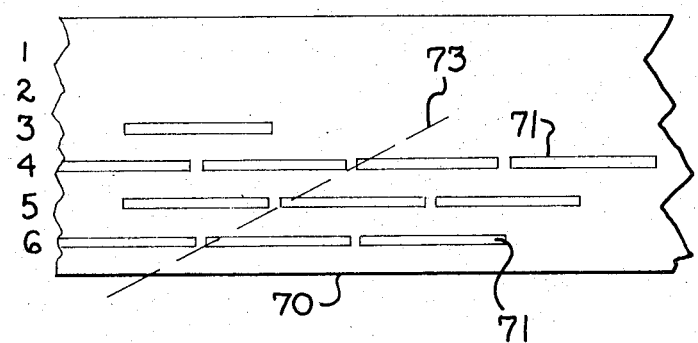
FIG. 6 is a view similar to FIG. 5 but showing a different pattern of cord arrangement which is within the broader scope of the present invention.

In FIG. 6, sheet 70 contains a plurality of rows of aligned lengths of cord 71. The terminal ends of the cords define an imaginary line 73 by reason of the fact that the sheet as produced in accordance with the present invention has the cutter blades in adjacent rows offset exactly between cutter blades of an adjacent row. Stated in another way, the terminal ends of the lengths in one row are exactly at the midpoint of a given length of cord in an adjacent row. The arrangement or pattern or disposition of cut lengths of substantially inextensible cords as illustrated in FIG. 6, while slightly better than that in FIG. 5, is still not eminently preferred because the imaginary line does connect terminal ends of adjacent lengths all the way across the sheet and thus defines a linear path which serves as a convenient line of propagation of the defect or stress induced, crack or failure, as might be suffered by the sheet embedded in the tire, either as a carcass ply or as a belt ply or breaker strip.

Figure 7:
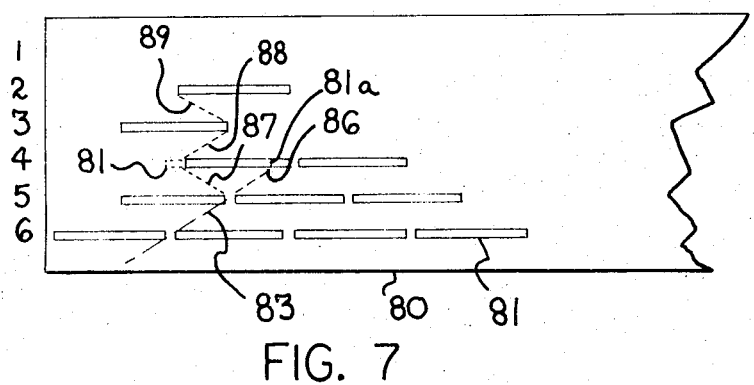
FIG. 7 is a view similar to FIGS. 5 and 6 but showing a pattern of cord disposition in accordance with a preferred embodiment of the present invention.

Reference may now be had to FIG. 7 wherein there is illustrated a preferred pattern of cord disposition in accordance with the present invention. In FIG. 7, the sheet 80 contains a plurality of aligned cut lengths 81 arranged in rows. Now the terminal ends of the lengths in Rows 5 and 6 define an imaginary line 83 (shown dotted) which proceeds angularly but linearly as shown. This imaginary line intersects the terminal end 81a of the length 81 shown in dotted outlet in Row 4. On the other hand, in accordance with the present invention, the length 81 is not disposed in the location shown in dotted outline but rather in the location shown in full solid line. With the length in this location, the imaginary line 83 does not intersect the terminal end of the cord shown in full line but intersects at the point spaced to the left of the terminal end, said point being identified by the reference numeral 86. Thus, the line 83, if representing a line of propagation of a stress failure extending there along, would find its path interrupted by the presence of the cord as at 86. The stress failure would thus stop. The existence or impression of still greater stress, assuming a zone of failure extending along the line 83, would, probably rather than propagate itself to the cord as at 86, tend to propagate along the line of lesser resistance, namely, the line 87 shown in dotted line, which proceeds in an opposite direction (left) to the terminal end of the cord shown in solid line in Row 4. The stress failure, if continued by greater applied tear forces, would cross transversely across the cord in Row 4 and then, by reason of the proper disposition of the cord in adjacent Row 3, would again have to reverse direction along the line 88 and thence in like fashion after passing Row 3 along the dotted line 89 to the closest terminal end of the cord in Row 2. Viewing the likely path of propagation of the failure, it can be seen that the path is defined by the lines 87, 88 and 89 which proceed in zigzag fashion. Any tendency for a given stress propagation line, such as the line 87, to continue linearly beyond the cord at the same angle would find the line intersecting a cord at a point intermediate its ends rather than at a given end, as in the case of the cord arrangement in FIGS. 5 and 6. Accordingly, in accordance with the present invention, it is eminently desired and preferred that the pattern of cord cutting of adjacent rows be such that an imaginary line connecting the terminal ends of two cut lengths in adjacent rows does not continue linearly to intersect the terminal cut end of a length in an adjacent row or to a row adjacent to the two base rows.

The effect of the foregoing structural features and design or pattern of cutting yields a sheet desirably containing mutually parallel cords of inextensible material which can thereby impart their desired reinforcing function to the ultimate product in which included. Additionally, the cords, being severed or cut, will allow the sheet including same to possess some degree of extensibility. At the same time, by the proper disposition and arrangement of the cut ends as described herein, propagation of stress failures will be limited very nearly the same as if the cords were continuous since a given imaginary line of propagation of stress cracking or failure proceeding from one cut end to another cut end will not proceed beyond two rows since the natural line of extension will intersect a cord body rather than a terminal end. Referring again to FIG. 7 representing pattern disposition in accordance with the present invention, it can be seen, for example, that the pattern of cutting of the lengths of inextensible cord in Row 4 has been conducted or arranged in such fashion that the terminal ends of the lengths of Row 4 are somewhat offset with respect to the midpoint of the cut cord lengths of Row 5 and, similarly, with respect to the midpoint of the cord in Row 3. This particular arrangement does not have to be followed completely with respect to every pattern of cutting of adjacent rows. The cutting should be such, however, that the imaginary line connecting terminal ends of adjacent cords in adjacent rows does not desirably or preferably intersect the cut end of a row on either side of the two base rows. Most desirably, the arrangement is such that the lines connecting the terminal ends of one row with the closest terminal ends of an adjacent row proceed generally in zigzag fashion as represented by the dotted lines 87, 88 and 89. Thus, the line 87 is proceeding angularly upwardly to the left, while the line 88 is inclined to the right and the line 89 is inclined to the left. With this explanation, it can be seen that a potential propagation failure line will either reach a dead end (by intersecting a cord) or will be redirected in a different direction, requiring the application of a greater force for continued propagation. Stated in another way, the structure, that is, the ultimate molded rubber product, will have a greater resistance to likelihood of failure by propagation of defect induced stress propagation. In effect then, the reinforcement provided by the substantially inextensible cord, preferably glass, is several fold. The glass cord per se can contribute its desirable physical properties, amongst which, but not limited thereto, are dimensional stability, imperviousness to moisture, inherent toughness, high modulus and compatibility. At the same time, the lengths being cut and therefore not continuous allow the totality of sheet containing same to exhibit a degree of elongation such that fabrication and building of the ultimate product in the unvulcanized state is enhanced. The sheet thus has the ability to exhibit a little "give." One example of this is evident when considering the sheet as employed in accordance with the present invention in the fabrication of radial tires, particularly when employed as carcass plies or breaker strip plies. Thus, the green tire structure will be capable, even when built in accordance with the flat band process normally employed in the manufacture of bias tires, of expansion to ultimate tire configuration as usually carried out in "Bag-O-Matic" type molds. As referred to earlier herein, in this latter technique, the essentially cylindrical green tire is located in the mold and an inner tube type bladder is inflated, pushing the central region of the cylinder outwardly into molding contact with the periphery of the mold defining the crown tread region of the ultimate tire. Lastly but not least, the ultimate product will have the resistance to stress propagation by reason of the proper location and disposition of the cord lengths in a pattern of location as described herein.

It will be appreciated that, in accordance with the present invention, an almost infinite variety of cord lengths, cord spacings and arrangement of patterns of cuttings of lengths in row to row are possible, providing a production of a vulcanizable elastomeric sheet containing glass reinforcement; which sheet is capable of being designed to meet particular stress conditions as are likely to be met by a particular region or location in the ultimate molded rubber product. All of this, of course, amplifies the ultimate aim of allowing and permitting the utilization of a basic raw material, glass, of precise finite properties of very specific kind to be incorporated into a rubber product in such a manner that these base properties may be thus taken advantage of. The purpose of all of this is to allow the base glass to have its basic inherent and desirable properties capable of full realization and translation when incorporated into rubber products of a wide variety of applications.

By way of further explanation, the process and product of the present invention finds particular application in the production of essentially endless belts as typified by the V-belts and conveyor belts. Glass cord, by reason of its inherent inextensibility, is a desirable candidate material as a reinforcement for such belts. However, in some cases, its very inextensibility can make the ultimate product difficult to install. A V-belt, for example, must be positioned over spaced pulleys having recess grooves for the belt. An absolutely inextensible belt is very difficult to install over two spaced pulleys without decreasing the distance between the shafts upon which the pulleys are mounted. A belt including therein the sheet reinforcement as described herein will permit of some stretching of the belt, whereby it may be slipped over the pulley without mechanically decreasing the pulley spacing. At the same time, the belt, in tension, will be subject to lateral service encountered forces, tending to produce a surface defect which will tend to propagate along the path of least resistance. A belt constructed utilizing the sheet material of the present invention would have a built-in resistance to stress or crack failure propagation.

Variations and modifications in the method as described as well as in the article herein described will be suggested by the foregoing descriptive specification and drawings and accordingly all such obvious equivalents are intended to be included within the scope of the present invention unless such would be clearly violative of the language of the appended claims.

I claim:

1. In a tire construction including spaced wheel rim securement means, a carcass ply connecting with said means and extending between same in toroidal fashion, and a ground-contacting tread carried at the crown of said carcass; the improvement wherein said carcass ply comprises an elastomeric sheet material extending continuously between the spaced wheel rim securement means and having embedded therein a plurality of rows of substantially inextensible reinforcement cord in mutually parallel array, each of said rows consisting of aligned discontinuous lengths of said substantially inextensible cord, said lengths in each row having their terminal ends closely spaced and almost touching, said lengths arranged in a repeating pattern across the entire of said elastomeric sheet and the terminal ends of said lengths forming a repeating pattern, the pattern being such that the terminal ends in any three immediately laterally adjacent lengths in immediately adjacent rows are in staggered relationship so that they can not be connected by a straight line.

2. The improvement as claimed in claim 1, wherein a majority of said terminal ends in a given row are slightly off center with respect to the mid point of a length of one of said lengths in an adjacent row.

3. The improvement as claimed in claim 1, wherein said cords are formed of a multiplicity of gathered-together glass filaments.

4. The improvement as claimed in claim 1, wherein said terminal ends are cut ends.

5. The improvement as claimed in claim 1, wherein said discontinuous lengths of said substantially inextensible cords are substantially the same length.

* * * * *